(12) United States Patent
Baek et al.

(10) Patent No.: US 6,721,618 B2
(45) Date of Patent: Apr. 13, 2004

(54) SYSTEM AND METHOD FOR AUTOMATICALLY GENERATING SEMICONDUCTOR EQUIPMENT COMMUNICATION STANDARD (SECS) MESSAGE SOURCE IN SECS COMMUNICATION

(75) Inventors: Wonin Baek, Seongnam-si (KR); Jaekwang Lee, Daegu-si (KR); Dongsik Min, Gwangju-si (KR); Jaegwang Lee, Namyangju-si (KR); Kyuheung Lee, Guri-si (KR)

(73) Assignee: Miracom, Inc., Seoul (KR)

( * ) Notice: Subject to any disclaimer, the term of this patent is extended or adjusted under 35 U.S.C. 154(b) by 85 days.

(21) Appl. No.: 10/178,556

(22) Filed: Jun. 25, 2002

(65) Prior Publication Data

US 2003/0004601 A1 Jan. 2, 2003

(30) Foreign Application Priority Data

Jun. 29, 2001 (KR) .................. 2001-0037988
Jan. 15, 2002 (KR) .................. 2002-0002269

(51) Int. Cl.[7] ............................ G06F 19/00
(52) U.S. Cl. .................. 700/121; 700/96; 700/97; 709/102; 702/100

(58) Field of Search ............... 700/121, 96, 97, 700/9, 266, 282, 101, 102, 111; 709/102, 183; 438/220, 231, 232

(56) References Cited

U.S. PATENT DOCUMENTS

| | | | | |
|---|---|---|---|---|
| 5,838,566 A | * | 11/1998 | Conboy et al. ............. | 700/115 |
| 5,859,964 A | * | 1/1999 | Wang et al. .................. | 714/48 |
| 6,208,904 B1 | * | 3/2001 | Mullen, Jr. .................... | 700/9 |
| 6,240,331 B1 | * | 5/2001 | Yun ............................ | 700/121 |

* cited by examiner

Primary Examiner—Leo Picard
Assistant Examiner—Kidest Bahta
(74) Attorney, Agent, or Firm—Jones Day

(57) ABSTRACT

A system and method for automatically generating software such that coding of a source program for use in controlling equipments may be automatically performed to the selection of data corresponding to a SECS message defining operations of the semiconductor fabricating equipments in the SECS message communications for a semiconductor fabricating or processing system. According to the present invention, it is possible to rapidly automate the equipment and perform ease maintenance and repair of the fabricating equipments and provide a more static environment for fabricating the semiconductor.

14 Claims, 18 Drawing Sheets

FIG.11

Stream 002 Function 041 Variant 002

```xml
<?xml version="1.0" ?>
-<eMD>-
    <SMG ID="0" SMG_Stream="2" SMG_Function="41"
    SMG_Version="2" SMG_Reply="False"
    SMG_SFV="002041002">
        <SIT ID="0" SIT_Name="L2" SIT_Format="0"
        SIT_Length="2" SIT_VList="False"
        SIT_Extract="False" SIT_Value="">
            <SIT ID="0" SIT_Name="HCACK" SIT_Format="16"
            SIT_Length="0" SIT_VList="False"
            SIT_Extract="False" SIT_Value="" /> -
    -<SIT ID="0" SIT_Name="L2" SIT_Format="0"
    -SIT_Length="2" SIT_VList="False" SIT_Extract="False"
    -SIT_Value=""> <SIT ID="0" SIT_Name="CPNAME1"
    -SIT_Format="16" SIT_Length="0" SIT_VList="False"
    -SIT_Extract="False" SIT_Value="" /> <SIT ID="0"
    -SIT_Name="CPACK1" SIT_Format="16" SIT_Length="0"
    -SIT_VList="False" SIT_Extract="False"
    -SIT_Value="" /> </SIT> </SIT> </SMG> </eMD>
```

SECS-H

SYSTEM AND METHOD FOR AUTOMATICALLY GENERATING SEMICONDUCTOR EQUIPMENT COMMUNICATION STANDARD (SECS) MESSAGE SOURCE IN SECS COMMUNICATION

BACKGROUND OF THE INVENTION

1. Field of the Invention

The present invention relates to a system and method for automatically generating software for use in SECS (Semiconductor Equipment Communications Standard) communications, and more particularly, to a system and method for automatically generating software such that coding of a source program for use in controlling equipments is automatically performed through the selection of data corresponding to SECS messages defining operations of the equipments involved in a semiconductor processing system for use in the SECS message communications.

2. Description of the Prior Art

Generally, a semiconductor processing system is linked to a host by way of equipment servers (hereinafter, referred to as "EQS") that supervise a group of equipments involved in a process.

Each of the equipments reports to the host the progressing status and results of each process. The host performs functions such as supervising and managing a series of semiconductor fabricating processes based on the report. Semiconductor fabricating equipments are generally classified into preprocessing equipments, assembly equipments, test and inspection equipments, other related equipments, etc. Since the semiconductor fabricating process is such a complex and diverse process that includes more than 500 steps, there are a variety of equipments involved therein.

Therefore, it is difficult to effectively manage the whole semiconductor fabricating process. To cope with the difficulty, most semiconductor fabricating equipments are managed by using a protocol for use in controlling them. The widely used protocol is a SECS protocol. That is, the SECS protocol is a communication protocol for supporting communication between equipments specifically designed for the semiconductor fabricating processes. The SECS protocol is a protocol or standard established by SEMI (Semiconductor Equipment and Material International) in order to efficiently achieve the communications between the semiconductor fabricating equipments.

The SECS is broken down into three layers: a GEM layer (GEM (Generic Equipment Model) and Application layer) for managing the semiconductor fabricating processes; a message generating layer (SECS-II layer) for reporting the progressing status and results of each process; and a message transmitting/receiving layer (SECS-I layer) for transmitting and receiving the generated message.

The SECS-I and SCS-II define communication interface standards between the semiconductor fabricating equipments and the host. The standards describe details for physical connection, signal size, data rate, protocol logic, and the like, which are required for message (information) exchange between the equipments and the host. The information exchange is made through a serial point-to-point line.

All the messages transferred based on the SECS protocol obey one or more message transfer standards, and each of the message transfer standards is processed as one transaction. Combinations of those transactions control and manage the semiconductor fabricating processes.

An operator of the semiconductor fabricating processes analyzes the feature of the equipments by using the SECS communication software and the processing procedures of the semiconductor fabricating processes executed by the equipments, prior to putting the SECS communication software into running.

Then, the operator prepares a scenario of the semiconductor fabricating processes based on the analysis results, wherein the scenario is mainly represented by flow of messages to be transferred between the host and the equipments. Such flow of messages constitutes the semiconductor fabricating processes.

FIG. 1 shows an example of a plurality of SECS messages transferred between the equipment and the server (EQS) in the SECS communications.

As shown in FIG. 1, the equipment transfers a SECS message of "S1 F13" representing communication establishment to EQS in order to start the semiconductor fabricating process. The EQS transfers an acknowledgment message of "S1 F14" to the equipment in order to respond to the message from the equipment. The equipment transfers a SECS message of "S1 F1" to the EQS, which is a query inquiring whether the equipment exists, and then, receives an acknowledgment message of "S1 F2" from the EQS. Subsequently, the equipment transfers a SECS message of "S6 F11" representing a mode change into the process control mode to the EQS, and receives an acknowledgment message "S6 F12" from the EQS. The operator for the equipment puts a product on the work table prior to starting the semiconductor fabricating process (Product Loading).

After the product loading, the operator for the equipment transfers a SECS message of "S6 F11" representing a loading completion to the EQS. The EQS transfers an acknowledgment message of "S6 F12" and a SECS message of "S2 F41" representing the instructions "start commission" to the EQS.

The equipment transfers an acknowledgment message "S2 F42" in response to the message "S2 F41" to the EQS, and transfers a SECS message "S6 F11" representing the process start to the EQS, and then receives an acknowledgment message "S6 F12" in response to the message "S6 F11" from the EQS. The operator of the equipment starts the fabricating process. When the fabricating process end, the operator for the equipment transfers a message of "S6 F11" representing an end of the process to the EQS, and then receives an acknowledgment message "S6 F12" from the EQS. The equipment transfers a message "S6 F11" of "Move Out Request" representing the product unloading from the work table to the EQS. The equipment receives an acknowledgment message "S6 F12" from the EQS, and unloads the process-finished product from the worktable (Unload a Cassette).

The equipment transfers a message "S6 F11" of "Move Out Complete" representing the completion of the product unloading to the EQS, and receives an acknowledgment message "S6 F12" for the message of "S6 F11" from the EQS. The equipment transfers a message "S6 F11" representing the preparation of the next process to the EQS, and receives an acknowledgment message "S6 F12" from the EQS. With this, the series of the semiconductor fabricating process is finished.

Referring to the FIG. 1, it is found that the SECS messages of "S6, F11" and "S6, F12" are used several times. That is, a SECS message is composed of a pair of one query SECS message and one response SECS message.

The query and response process between the EQS and the equipment may be described as follow: for example, when the SECS message of "S6, F11" is transmitted from the equipment to the EQS, an operator of the EQS should check data values contained in the received SECS message of "S6, F11" to analyze what the data values mean.

Further, the operator should generate a response message and a control message corresponding thereto, and then, must perform a manual coding of a source program for implementing the generated response and control messages and send it to the equipment.

FIG. 2 shows an example of a SECS message transferred between the equipment and the server (EQS) in the SECS communications.

As shown in FIG. 2, each SECS message presents a unique expression thereof such as "S6, F11", a combination of one of stream numbers (S1 to S128) and one of function numbers (F1 to F128).

In FIG. 2, it may be easily understood that the SECS message of "S6, F11" is used for host command confirmation (HCA) b the Function name of which because the transfer direction is from the equipment to the EQS, and it is necessary for the EQS to respond to the message toward the equipment. Further, the item of the SECS data included in "S6 F11" message is "L, 3" (210). That is, "L, 3(210)" means three data lines, the first line contains <DATAID> (220) representing a series of data ID, the second line contains <CEID> (230) representing "collect event ID", and the third line contains "L,2" (240) composed of two lines. The first line of "L,2" (240) contains <RPTID> representing "report ID", and the second line of L, 2 is composed of another three lines L, 3 (260) which contain <PORT> (270) representing "port number", <LOTID> (280) representing "lot or product ID", and <PPID> (290) representing "process program ID".

The operator of the EQS analyzes the characteristics of the equipment and process flow of the semiconductor fabricating process implemented by the equipment. In addition, the operator for the equipment generates a scenario of the semiconductor fabricating process based on the analysis result, and should conduct coding of data of the SECS messages used in SECS communication as shown in FIG. 2.

Generally, full automation of an individual equipment is achievable when it involves 20~30 or 50~60 at most SECS messages. Each SECS message is previously defined so that they are transmitted to the equipment or server at a predetermined time.

If a single SECS message is used for a single specific condition, there would be no difficulty in controlling the equipment. Under certain conditions, however, a single SECS message may be used in more than one condition as "S6 F11" shown in FIG. 1, and further, the status of the respective equipment is defined by the data values contained in the message, which may arise problems.

Therefore, since the operator should spend a lot of time in analyzing all of several tens SECS messages transferred between the equipment and the EQS and in coding the source program, there is a problem in that work efficiency is severely lowered.

Moreover, the semiconductor fabricating equipments are relatively expensive. In operating such expensive semiconductor fabricating equipments, if an EQS is made and then directly applied to the equipments without any prior test of the EQS, this is most undesirable in view of use of the equipments and as well is a factor in reduction of productivity thereof.

Furthermore, the conventional SECS communication software mentioned above bears a drawback that it is equipment-specific or equipment-dependent; that is, it should be reorganized according to each feature of the semiconductor fabricating equipments whenever used to perform operation and management for each fabricating process. Thus, the SECS communication software could not have a consistent structure.

As a result, since the SECS communication software should be adapted to various fabricating equipments, which entails a variety of problems such as duplicated investment, lowering of reliability due to repeated tests, difficulty in maintenance, and the like.

SUMMARY OF THE INVENTION

The present invention is contemplated to solve the aforementioned problems. An object of the present invention is to provide a system and method for automatically generating SECS message source by assigning specific variant number and sequence name according to data of the SECS message capable of determining operations of the equipments in the SECS message communications for a semiconductor fabricating or processing system, and such that coding of a source program for use in controlling equipments may be automatically performed.

Another object of the present invention is to provide a system and method for automatically generating SECS message source by providing SECS message definition, communication logging file and logging file of the equipment server on the basis of the extensible Markup Language (XML) in Internet circumstances, such that capable of checking, analyzing, controlling and modifying SECS message communication between semiconductor fabricating systems at remote place.

According to an aspect of the present invention, there is provided a method for automatically generating SECS message source in an environment including a plurality of equipments performing a semiconductor fabricating process, and a plurality of equipment servers for automatically performing coding of a program source corresponding to the SECS message communicated with the equipment depending on the features of the equipment and the fabricating process, comprising the steps of (a) defining a SECS message for use in control of the semiconductor fabricating process; (b) defining data on features of said each equipment; (c) defining a sequence name identifying the semiconductor fabricating process, (d) combining SECS messages required for the defined sequence name; (e) defining equipment groups according to the features of the equipment by combining SECS messages with the defined sequence name; (f) generating SECS message by automatically performing coding of each SECS message source for the defined equipment group respectively.

According to another aspect of the present invention, there is provided a system for automatically generating SECS (Semiconductor Equipment Communications Standard) message source comprising a plurality of equipment performing semiconductor fabricating process; a MES for performing management of progresses and histories of lots, and resources on a manufacturing site; a database for storing the defined SECS messages and the data inputted from the equipment; and, a equipment server system including a SECS message defining unit for defining SECS messages for use in control of semiconductor fabricating processes, an equipment feature defining unit for defining data on features of equipment, an equipment group defining unit for defining sequence names involved in the semiconductor fabricating processes and defining equipment groups by combining SECS messages required for the defined sequence names, a communication interface defining unit for defining an interface for communications with the equipment, a SECS message source generating unit for automatically performing coding of a SECS message source for each defined equipment group, a test simulation unit for testing the defined SECS messages and equipment by means of simulation, a network interface card for establishing a physical connection for the communications with the other systems, and a control unit for supervising overall control operations of the server system and controlling automatic generation of the SECS message source.

According to another aspect of the present invention, there is provided an Internet system for fabricating semiconductor comprising Internet network for use in transmitting and receiving data between computers distributed at remote place; at least one equipment for performing semiconductor fabricating process; at least one equipment server for communicating the SECS message with the equipments connected thereto; and a host computer connected to the Internet for automatically generating SECS messages and communication logging files used for SECS message communication between the equipments and the equipment servers(EQS) in the form of extensible Markup Language (XML), and for controlling SECS message communication between the equipments and the equipment servers (EQS).

BRIEF DESCRIPTION OF THE DRAWINGS

The above and other objects and features of the present invention will become apparent from the following description of a preferred embodiment given in conjunction with the accompanying drawings, in which:

FIG. 11 is an exemplary display illustrating the result of the SECS message definition in the form of XML;

DETAILED DESCRIPTION OF THE INVENTION

Hereinafter, a preferred embodiment of the present invention will be described in detail with reference to the accompanying drawings.

Figure 1:
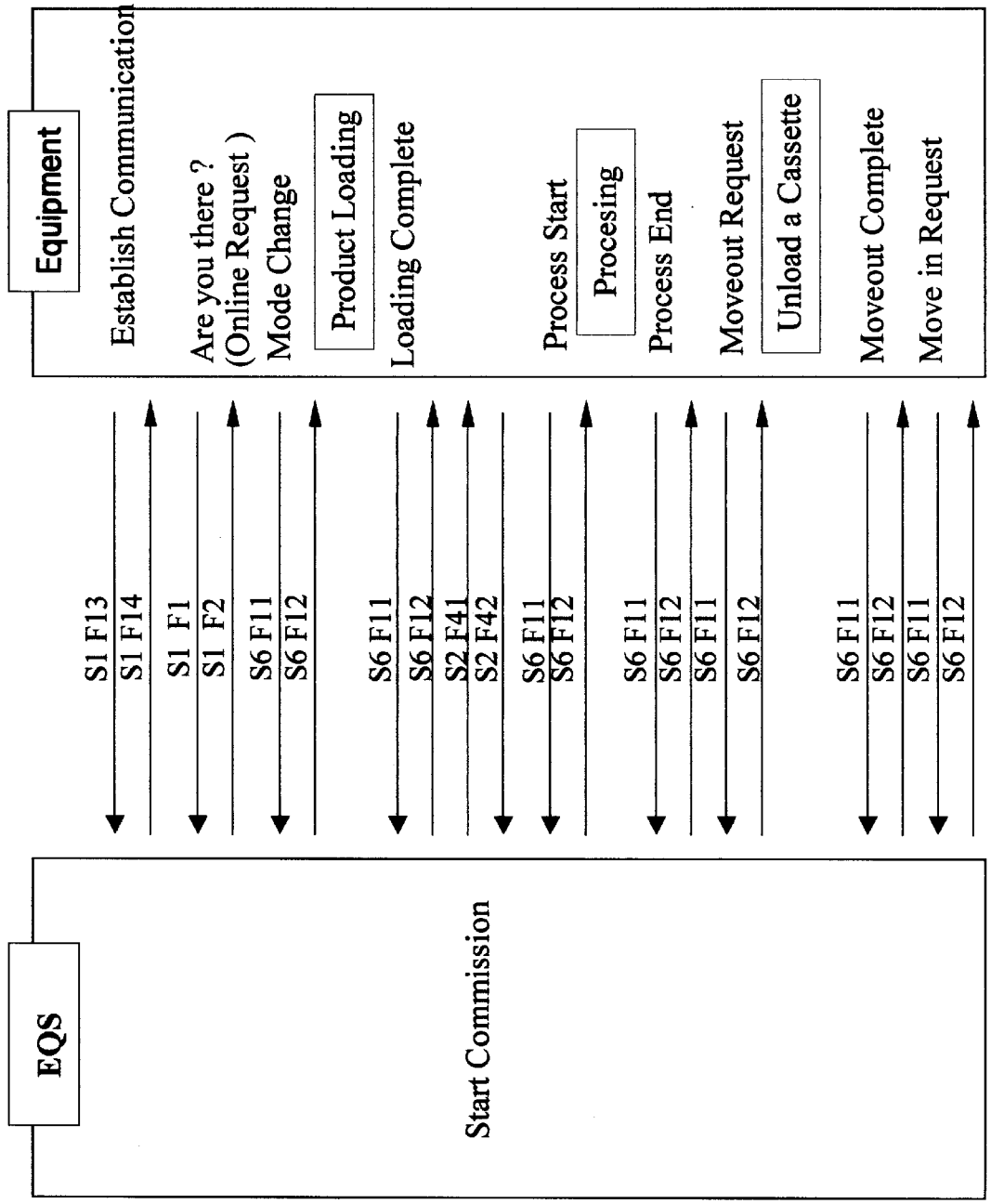
FIG. 1 shows an example of the SECS message communicated between the equipment and equipment server (EQS) in SECS communications.
Figure 2:
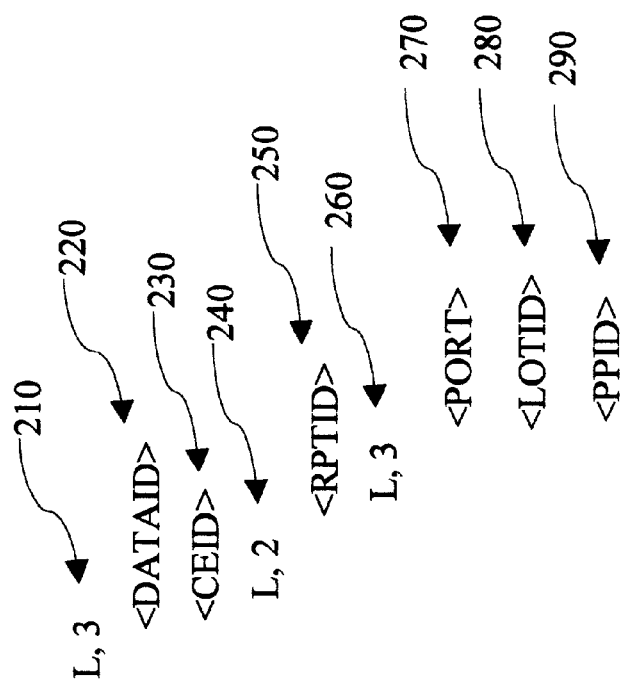
FIG. 2 is an exemplary view showing the structure of a SECS message shown in FIG. 1.
Figure 3:
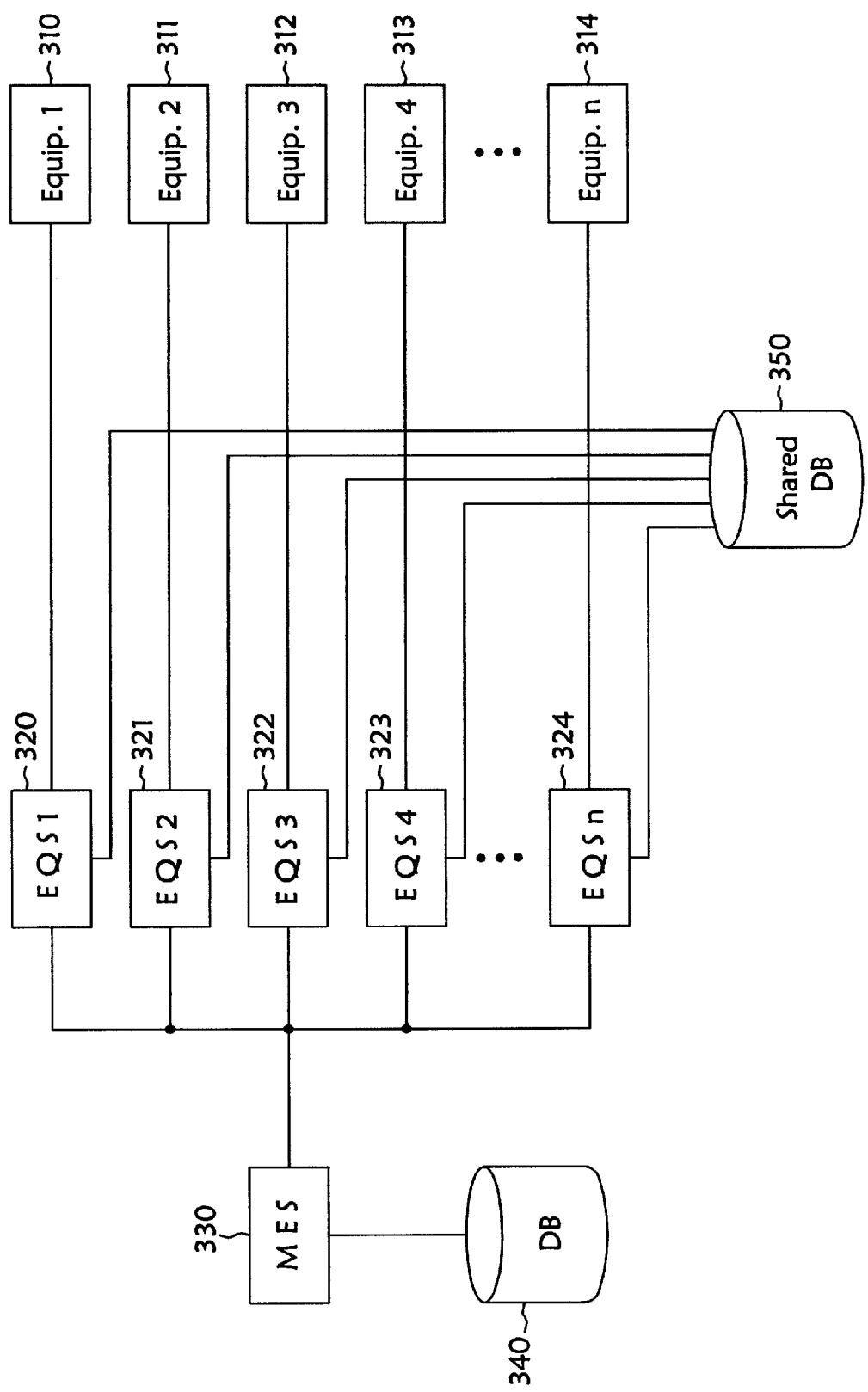
FIG. 3 is a block diagram schematically showing the constitution of a semiconductor fabricating system, for explaining a method for automatically generating SECS message source in the SECS communications according to the present invention.

FIG. 3 is a block diagram schematically showing the constitution of the system for automatically generating SECS messages according to the present invention.

The system for automatically generating SECS message source according to the present invention comprises a plurality of equipments 310~314 performing semiconductor fabricating process; a plurality of equipment server (EQS) 320~324 which define SECS messages, automatically generate SECS message source such that perform SECS communication with the equipments 310~314; a manufacture execution system (MES) 330 for performing management of progresses and histories of lots, and resources on a manufacturing site; a database 340 for storing data required for operating the manufacture execution system 330; and a shared database 350 for storing SECS messages defined in EQSs 320~324 and data inputted to the equipments 310~314.

Figure 4:
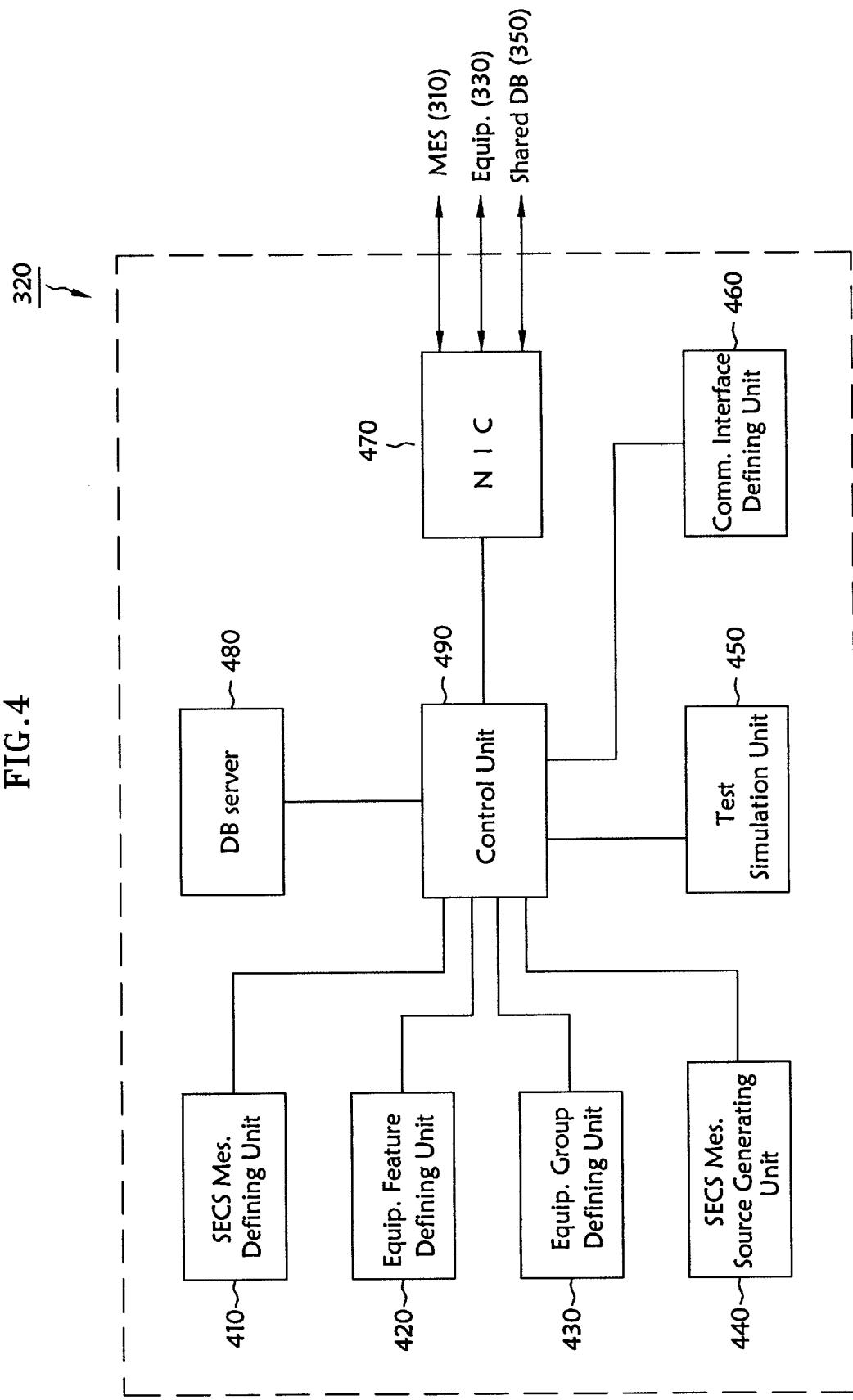
FIG. 4 is a block diagram showing the inner functional constitution of the EQS shown in FIG. 1.

FIG. 4 is a block diagram schematically showing functional constitution of the EQS1 320. The constitution of the EQS is described with reference to only EQS1 320, since another EQSs 321~324 comprise same components.

The EQS1 320 of FIG. 4 includes a SECS message defining unit 410 for defining the SECS messages for use in the control of the semiconductor fabricating processes; an equipment feature defining unit 420 for defining data on the features of an equipment; an equipment group defining unit 430 for defining control sequence names of each fabricating process unit and defining equipment groups by combining SECS messages for use in the defined control sequence names; a SECS message source generating unit 440 for automatically executing the coding of the SECS message source corresponding to the defined equipment groups; a test simulation unit 450 for testing the equipment and defined SECS messages by means of simulation; a is communication interface defining unit 460 for defining an interface for communications with the equipments 310; a NIC (Network Interface Card) 470 for establishing a physical connection for the communications with the equipments 310 or the other systems; a database server 480 for storing data resulting from operations of the EQS1 320 in the database 340 and for storing the generated SECS message; and a control unit 490 responsible for overall control operations of the system and automatic generation of the SECS message source.

The SECS message source generating unit 440 is composed of a software program for automatically coding the defined SECS message by means of various programming languages such as C, C++, Visual Basic and so on. The execution file thereof may be displayed on screen window in the form of an icon.

The control unit 490 of the EQS1 320 pre-defines the SECS messages for controlling the equipment 1 310, the features of the equipment, the control sequence names combined with the SECS messages, the communication interface and the like. When the control unit 490 receives a certain SECS message from the equipment 1 310, it controls the function of automatically generating a response SECS message corresponding to the received SECS message and transmitting it to the equipment 1 310.

Figure 5:
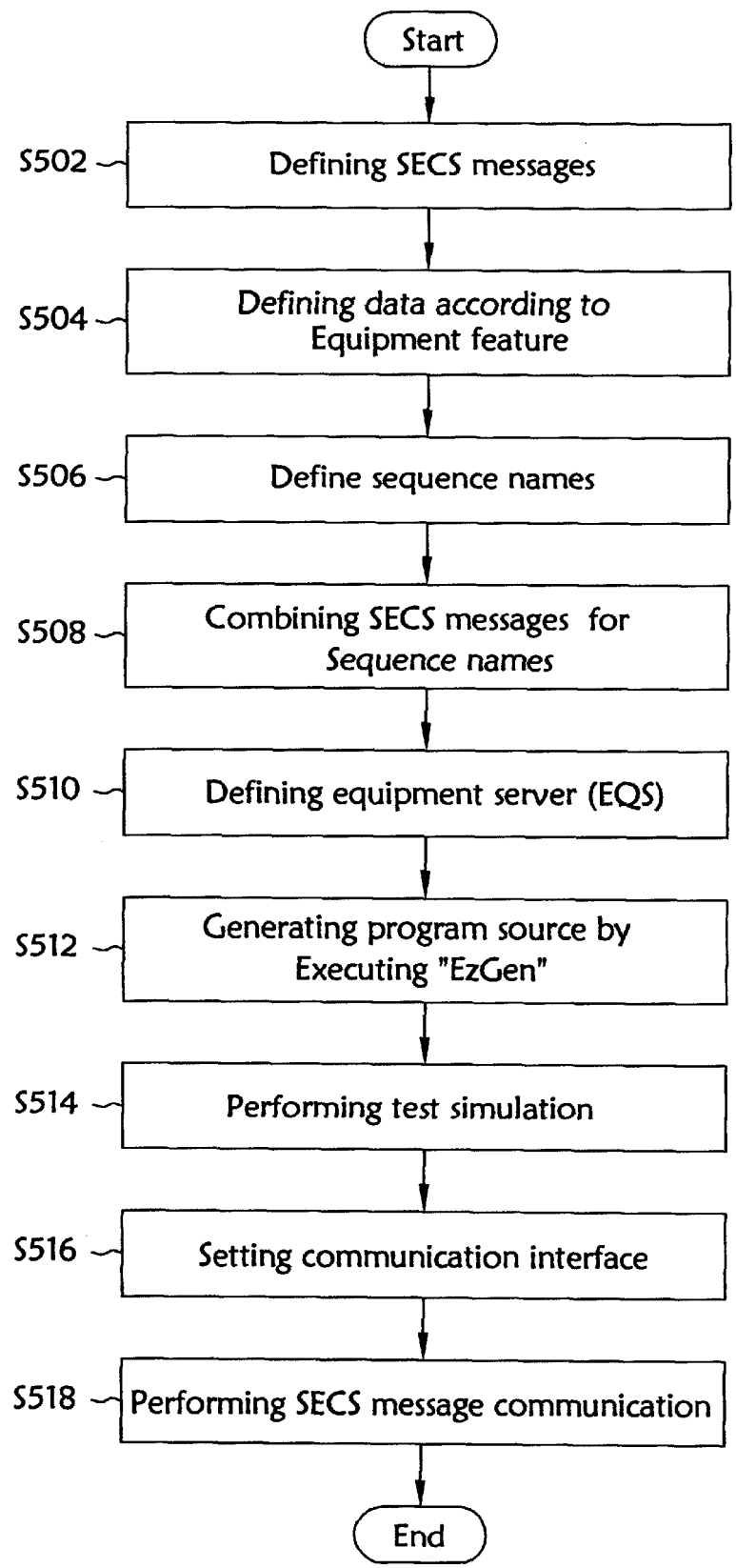
FIG. 5 is a flow diagram for explaining the method for automatically generating the communication software in the SECS communications according to the present invention.

Subsequently, the operations of the system for automatically generating SECS message source in accordance with the present invention will be described in detail with reference to the flow diagram shown in FIG. 5 and the displays depicted in FIGS. 6 to 17.

For the purpose of illustration, the software program of the SECS message source generating unit 440 is referred to as "EzGen" standing for an ease generator.

Firstly, in the EQS 320 for controlling the equipment 1 310 via on-line, the operator executes the "EzGen" installed in the EQS1 320. When a command for running the "EzGen" is inputted from a key input means, the control unit 490 of the EQS1 320 displays a picture for defining SECS message for use in controlling semiconductor fabricating process, as illustrated in FIG. 6.

Figure 6:
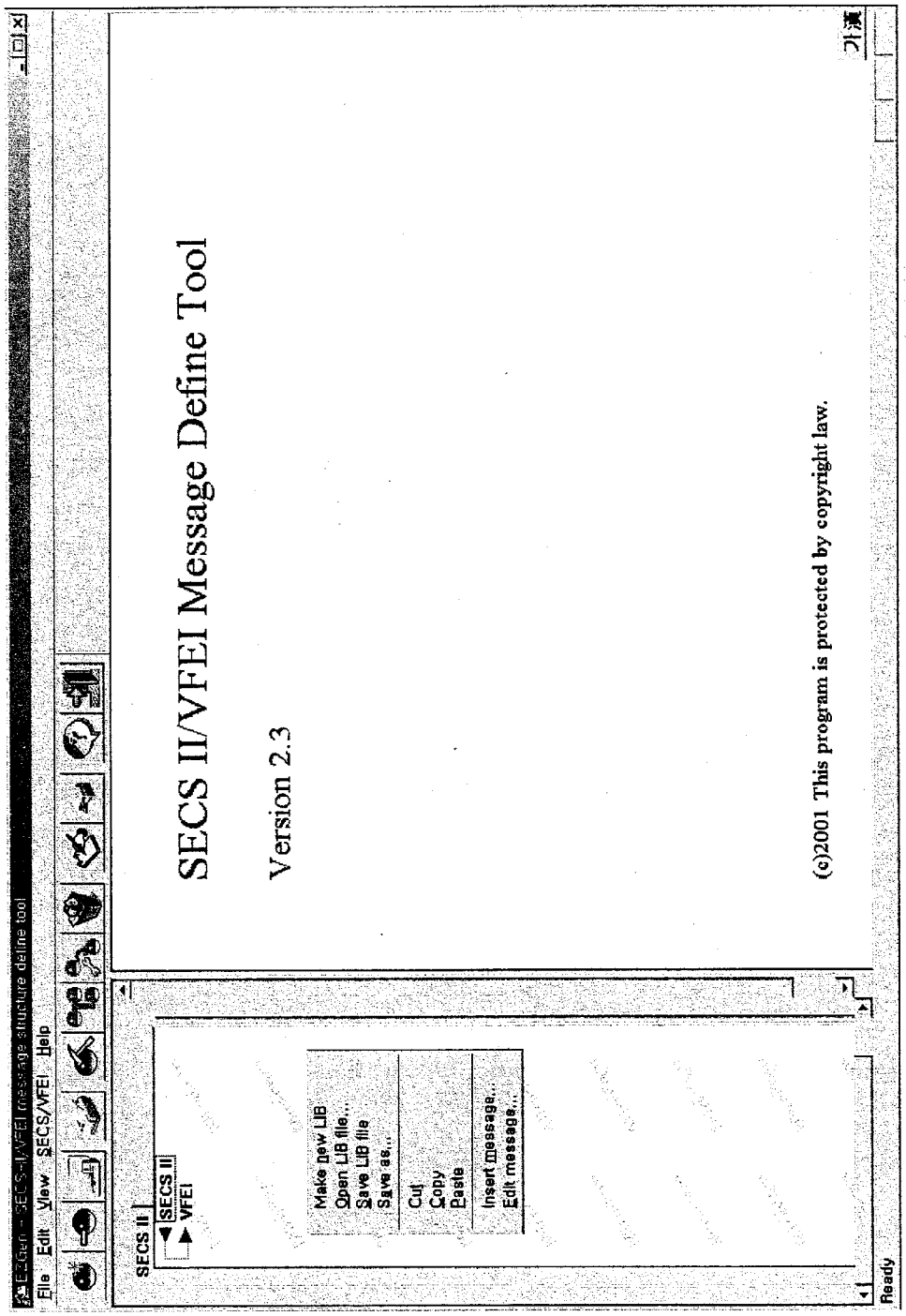
FIG. 6 shows an exemplary display for defining the SECS messages required for control of semiconductor fabricating processes.

The picture of "EzGen" shown in FIG. 6 is a graphic user interface (GUI) display used for defining, generating, editing and copying of the SECS messages. The list of the generated SECS messages is displayed on the left, and the contents of the SECS message selected from the SECS message list are displayed on the right.

Figure 7:
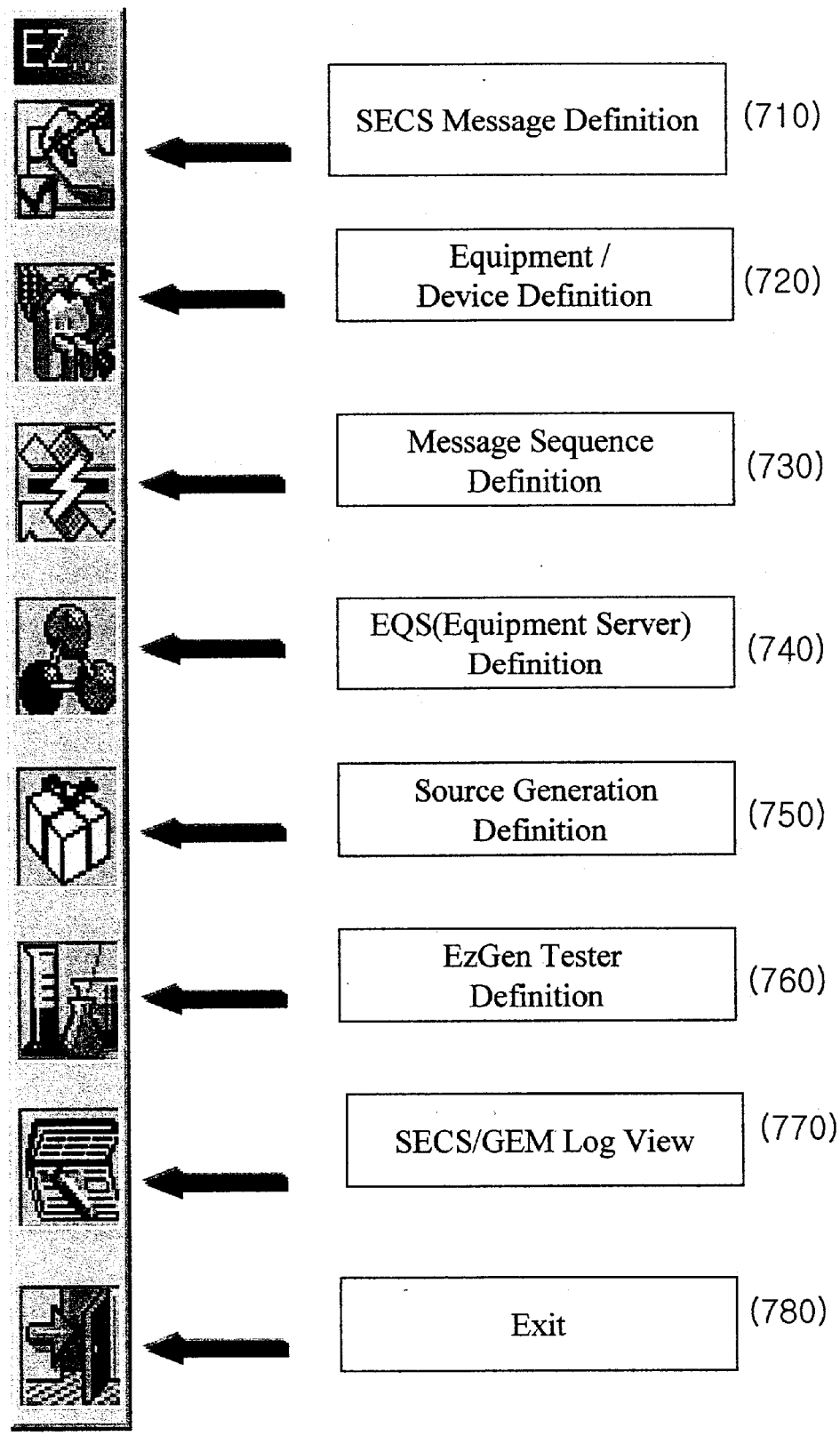
FIG. 7 shows an example of a menu bar for performing "EzGen"

In addition, as shown in FIG. 7, the picture of "EzGen" provides a menu bar display including: a message definition menu button 710 for defining a SECS message; an equipment definition menu button 720 for defining the feature of the equipment; a sequence definition menu button 730 for defining the control sequence names; a EQS definition menu button 740 for defining the EQS; a source generation definition menu button 750 for generating the source corresponding to the SECS message; a tester definition menu button 760 for testing the defined "EzGen"; a log view menu button 770 for reading the log file for the SECS message transferred from the equipment; and an exit menu button 780 for closing the function of "EzGen".

Subsequently, first of all, the operator of the system defines the SECS message used in SECS communication by clicking the message definition menu button 710 in the menu bar (Step S502).

Figure 8:
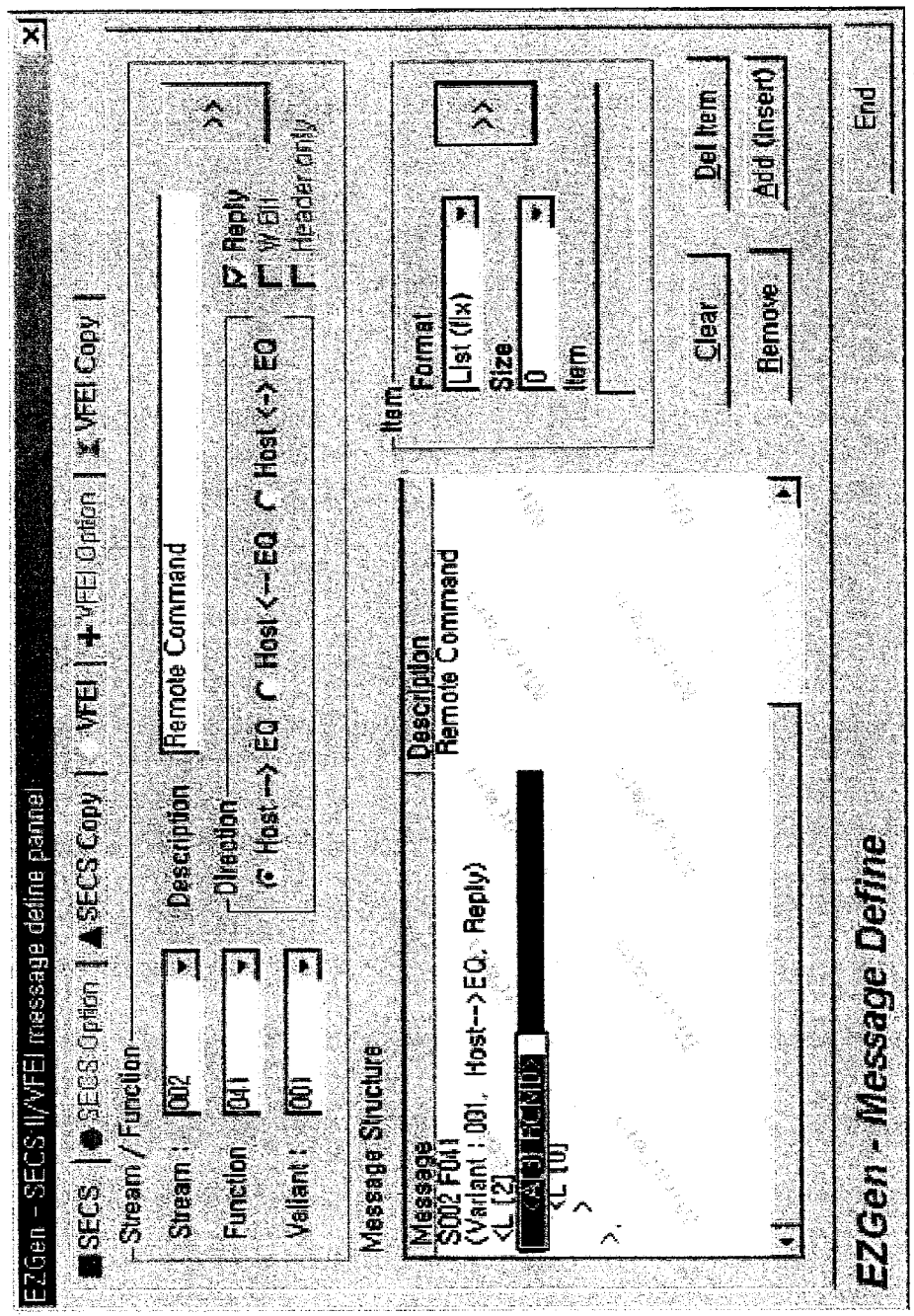
FIG. 8 shows an exemplary display for inputting SECS message definition.

Upon clicking the message definition menu button 710, the control unit 490 display a picture for inputting SECS message definition as shown in FIG. 8, which includes input blanks for filling out a stream, function and variant of the SECS message, and additional input blanks for filling out descriptions on the SECS message, transfer direction of SECS message, existence of reply, and message structure.

The operator, for example, types in "002" for the stream value, "041" for the function, "002" for the variant, "Remote Control" for the description, "Host→EQ" for the transfer direction, "Reply exist", and "SML" for the message structure, and then the SECS message named as "S002 F041 V002" may be defined. When data required for SECS message are inputted, the Operator clicks "End" button in order to finish the definition of the SECS message.

Figure 9:
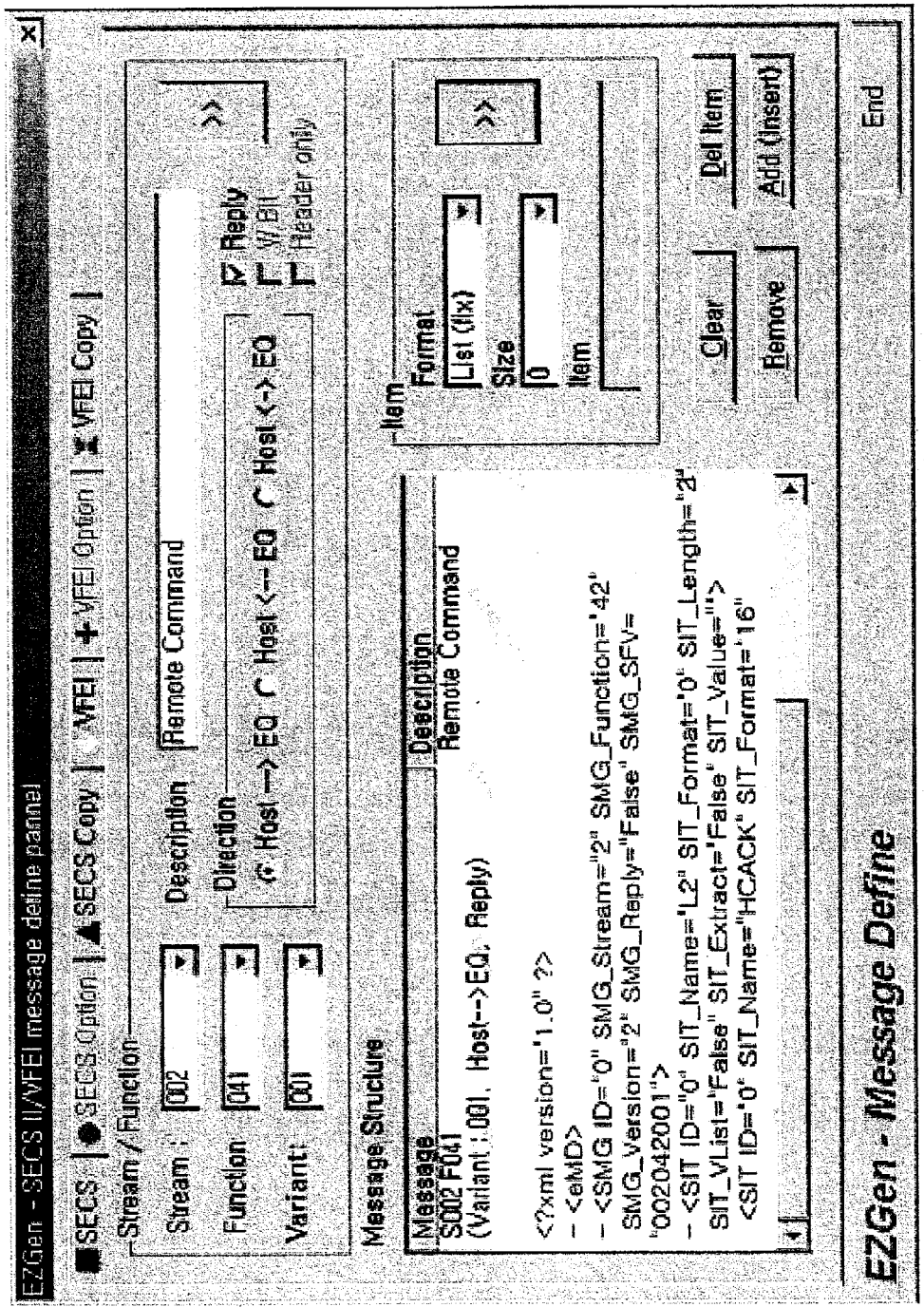
FIG. 9 is an exemplary display illustrating the defined SECS message in the form of XML.
Figure 10:
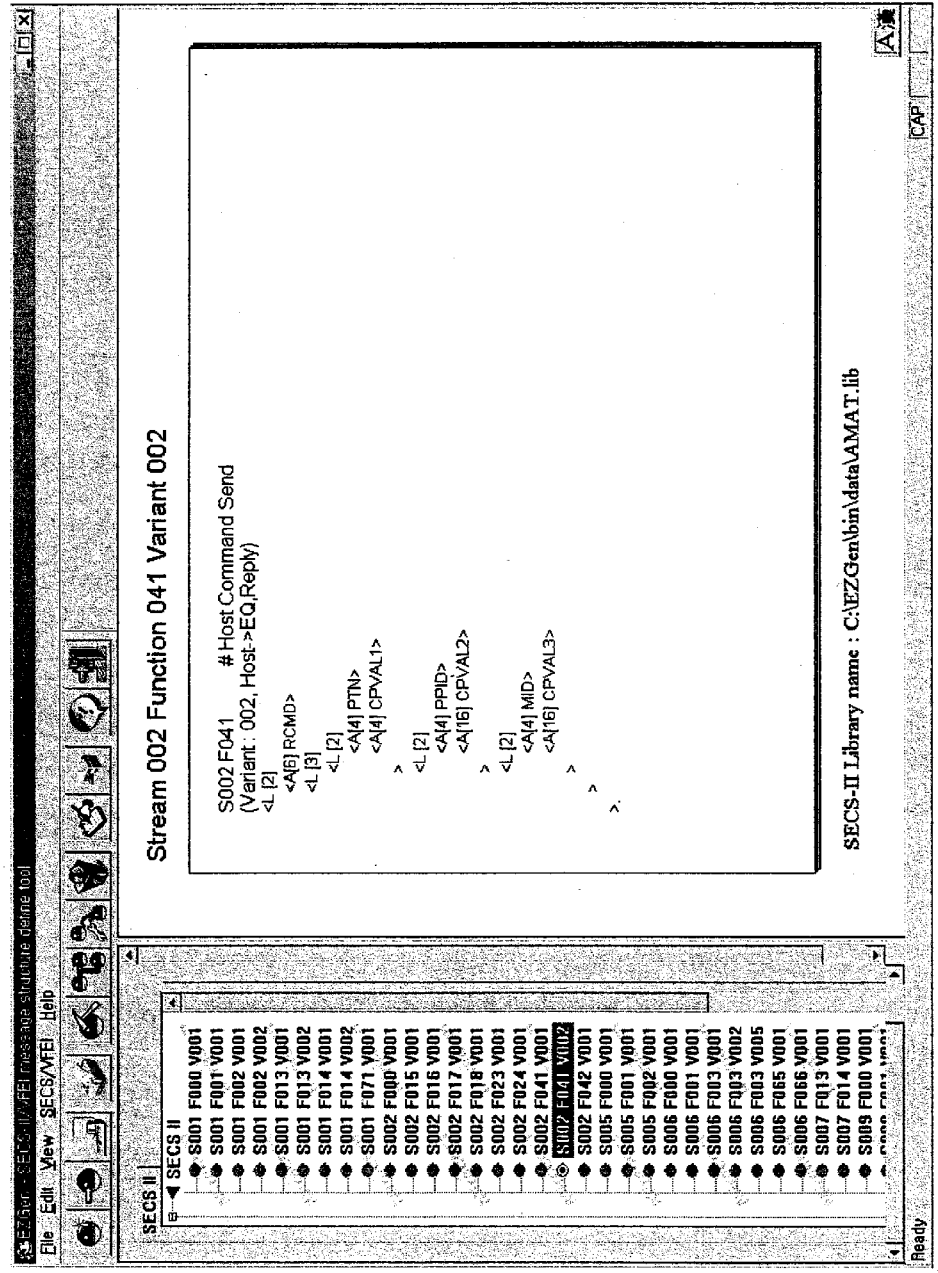
FIG. 10 shows a result of the SECS message definition.

After the definition of the SECS message, the control unit 490 operates the data base server 480 for storing the typed-in and defined data into the database 340, stores the file of XML format shown in FIG. 9, and outputs the result display picture for SECS message definition shown in FIG. 10.

The picture for the SECS message definition shown in FIG. 10 displays a SECS message including list of a plurality of SECS messages in the left part. Each SECS message included in the SECS message list may be expressed by the combination of the stream, function and variant such as, for example, "S002 F041 V002". 'S', 'F' and 'V' mean the stream, function and variant respectively. The subsequent number next to the letter implies a serial number. Furthermore, in the right part, contents of the program source for the SECS message is displayed in the Spacecraft Markup Language (SML) form, which is selected from the SECS message list. The result of the SECS message definition is stored in the form of XML as shown in FIG. 11.

The operator may select one SECS message from the SECS message list, and then, modify or edit it, and finally copy it to another library. Herein, the library means packages, each including a group of similar SECS messages.

Figure 12:
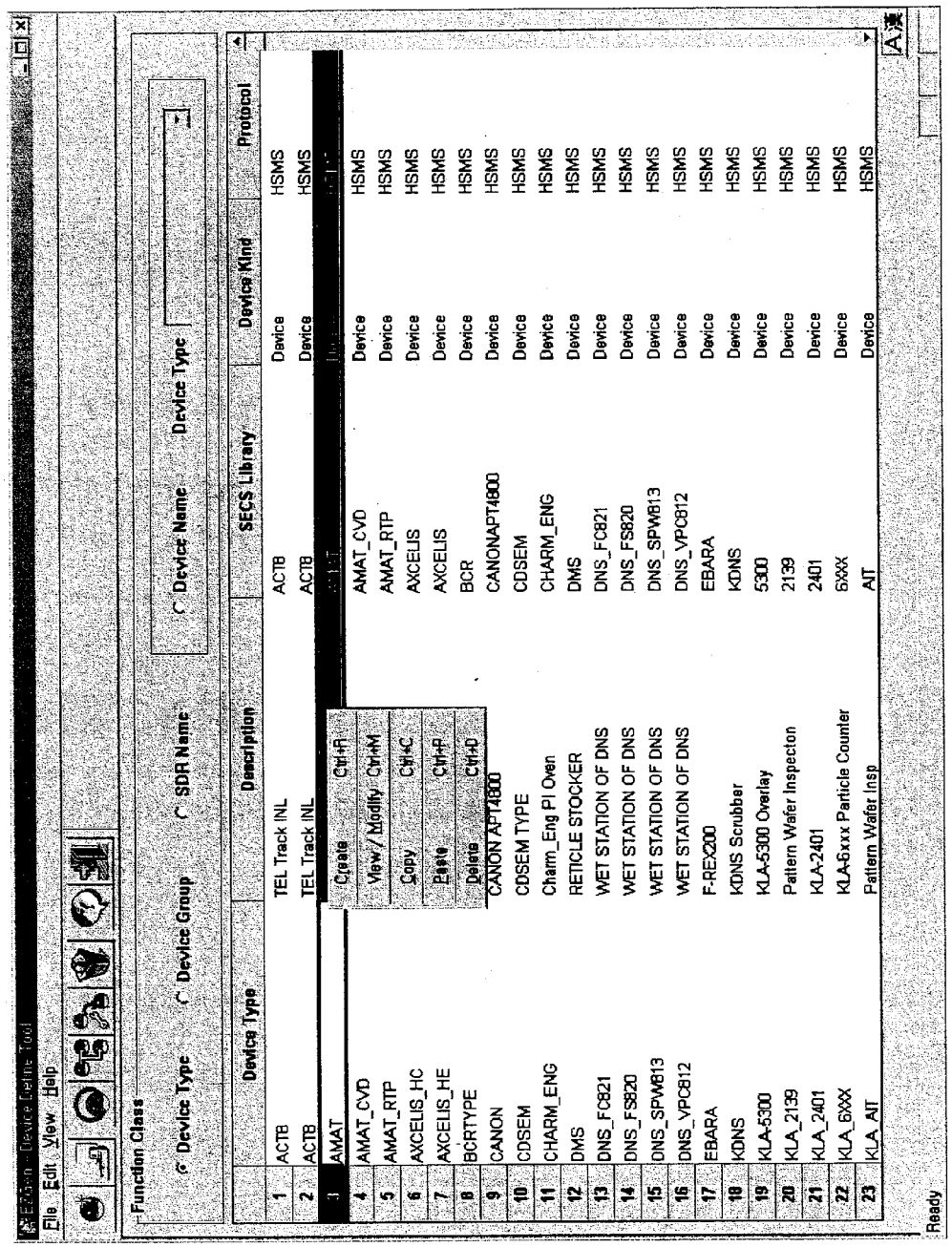
FIG. 12 shows an exemplary input display for defining features of the equipments.
Figure 13:
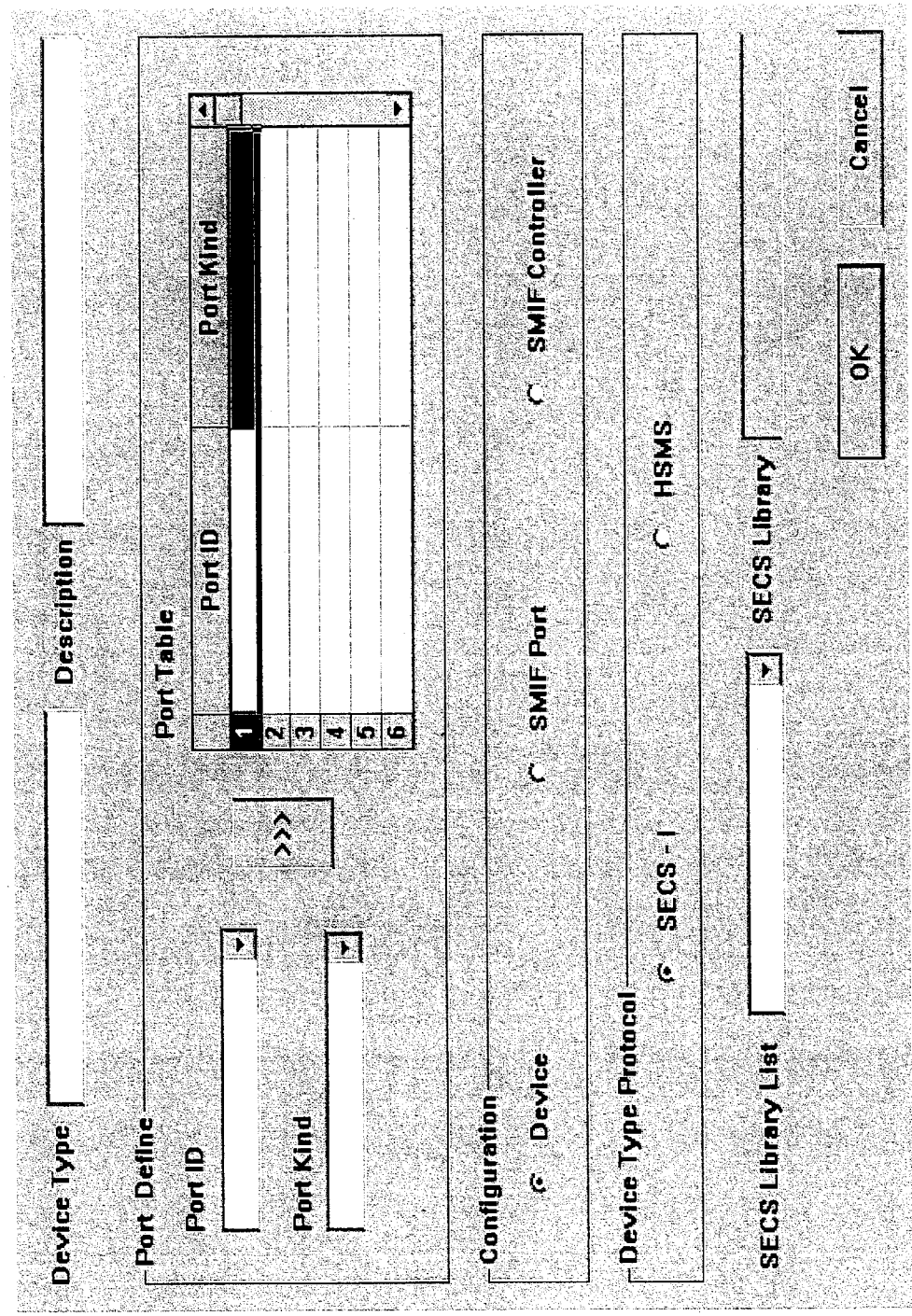
FIG. 13 shows an exemplary input display for establishing a type of the equipments.

Next, the operator defines data required for the equipment establishment by clicking the equipment definition is menu button 720 for defining the features of the equipment (Step S504). When the equipment definition menu button 720 is clicked, the control unit 490 provides the input display as shown in FIG. 12 for defining the feature of the equipment. The operator can select and define an equipment type (Type), an equipment group (Group), a server driver name (SDR Name), an equipment name (Device Name) and the like by means of the input display of the FIG. 12. The result of the definition for the equipment feature may be expressed and displayed by means of the equipment type, description, SECS library, and protocol, etc.

In the input display for defining the equipment feature of the FIG. 12, when the operator clicks the right button of mouse in order to specify the equipment type, the control unit 490 displays several sub-menus such as "Create", "View", "Copy", "Paste", "Delete", and so on. The operator selects the sub-menu of "Create" in order to establish the equipment type, then the control unit 490 provides the input display of the FIG. 13 which enables the operator to input data for establishing the equipment type. The input display of the FIG. 13 includes several input blanks for filling out the type of the equipment (Device Type), a description on the equipment (Description), a specification of the port (Port ID, Port Kind, Port Table), an equipment type protocol, a SECS library (SECS Library List), and so on. After the operator fills out the input blanks for establishing the equipment type, the control unit 490 stores the inputted data into the database 340 and displays the result together with a plurality of lists as shown in FIG. 12.

Figure 14:
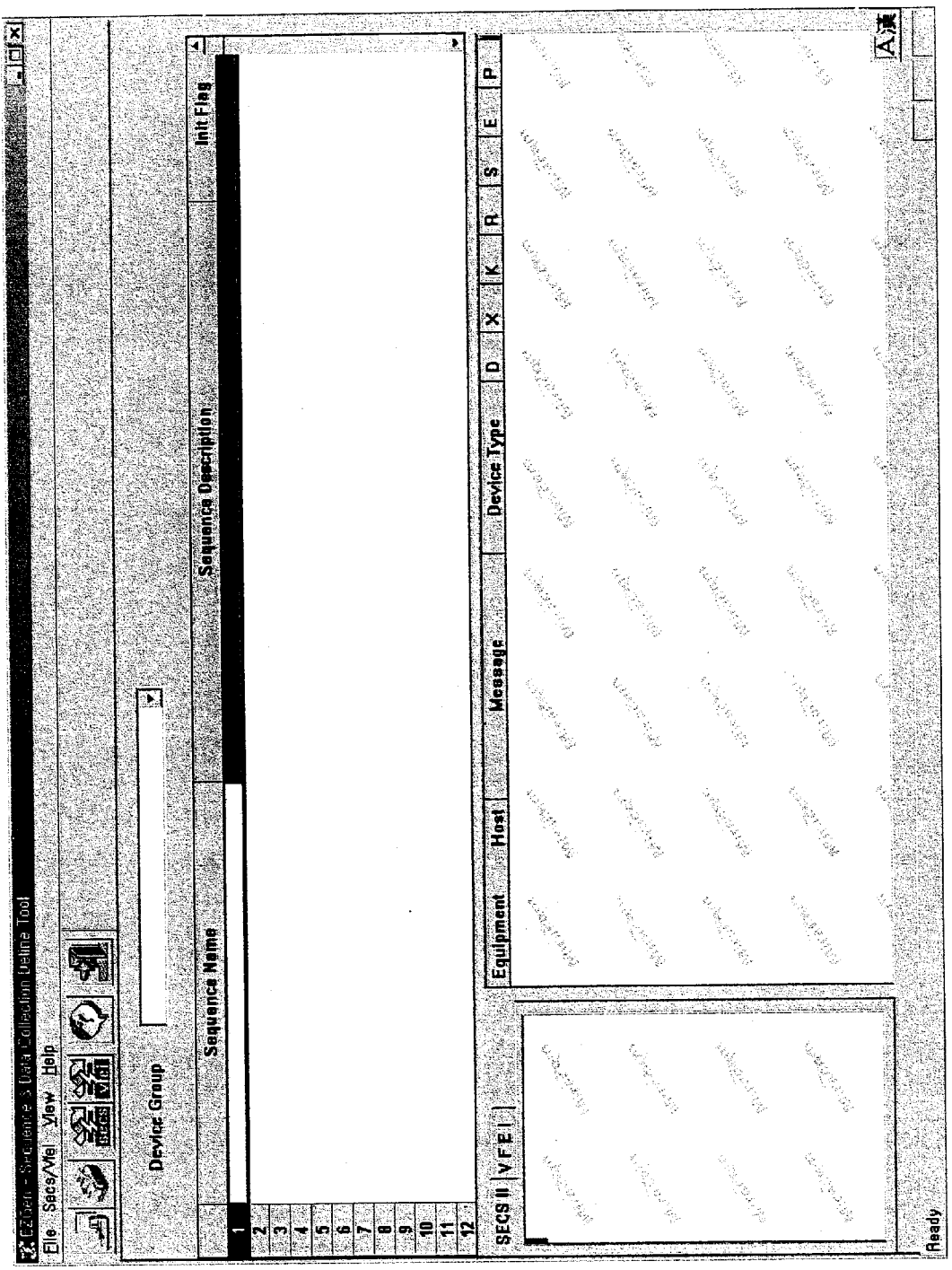
FIG. 14 shows an exemplary display for the equipment group.
Figure 15:
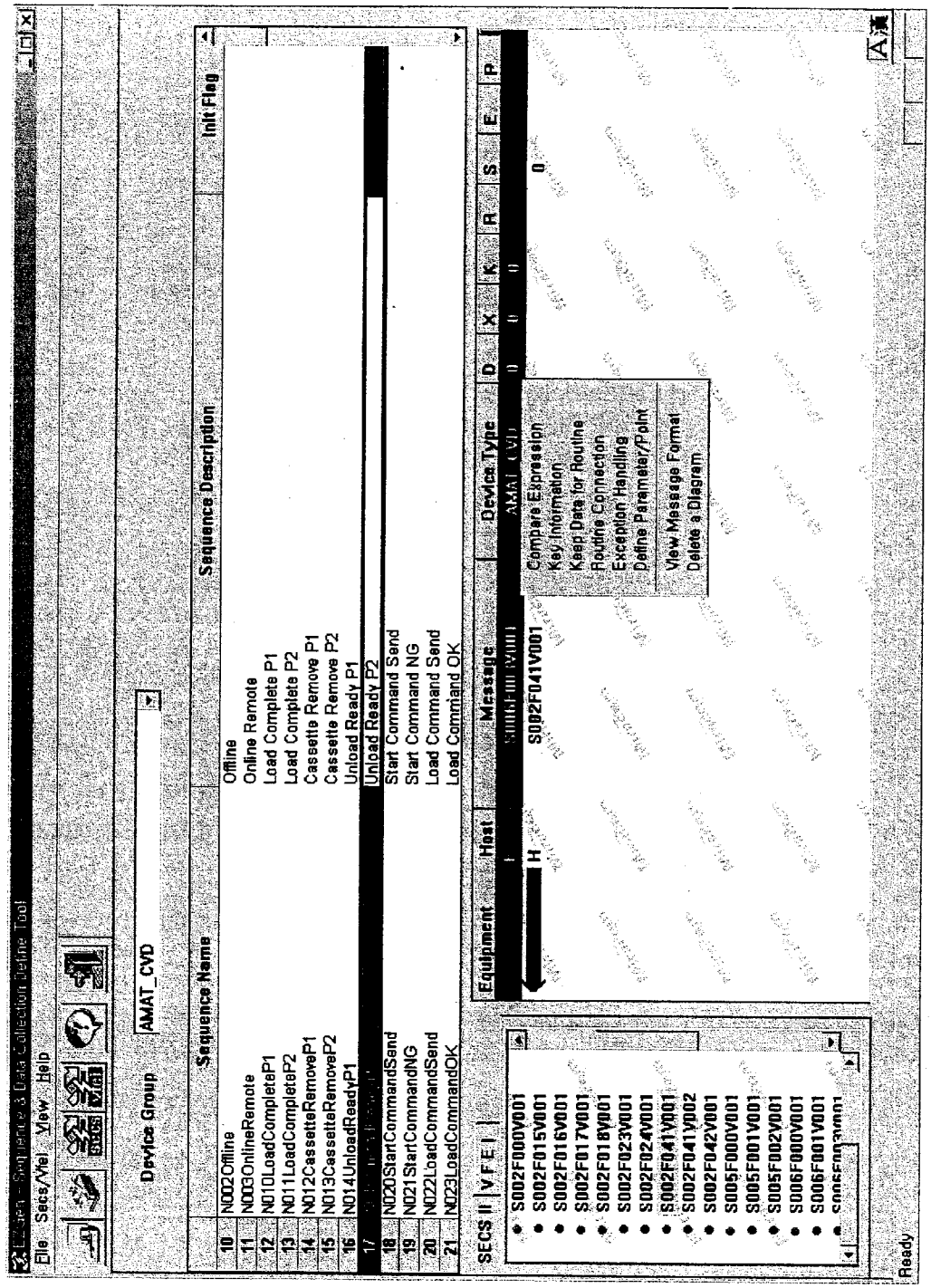
FIG. 15 shows an exemplary display for defining a sequence name corresponding to the equipment group.

The operator defines the equipment group after the definition of the equipment type. When the operator selects the item (Check box) of equipment group in the display for equipment feature as shown in FIG. 12, the control unit 490 provides the display picture related to the equipment group as illustrated in FIG. 14 in which the upper frame includes a combo-box for selecting equipment group, a sub-frame for displaying sequence name and sequence description, and the lower frame displays the SECS message list, transfer direction, message, equipment type and so on. The operator clicks the right button of the mouse and selects the "Create" menu from the sub-menu in order to create equipment group, then the control unit 490 provides display picture including several input blanks for filling out a name of the equipment group, description on the equipment group, facility including the equipment group, protocol, library type, list of the equipment group and the like. When the operator fills out data into all of the above-mentioned input blanks, the control unit 490 stores the inputted data on the equipment group establishment, and displays the results as shown in FIG. 15 in which the sequence name and sequence description are displayed in the upper part, the SECS message list is displayed in the left of the lower part, and the transfer direction of SECS message, equipment type and combined SECS message are displayed in the lower right.

The operator defines the server driver name after the definition for equipment group. When the operator selects a SDR name in the check box in the display for equipment feature as shown in FIG. 12, the control unit 490 provides the display picture (Not shown) for inputting the server driver name (SDR name), more specifically, the SDR name, a description on the server driver, a node name, a block count, a server driver protocol (SDR protocol) and the like. When all of the data on the SDR name are inputted, the control unit 490 stores it into the database 340.

The operator, next, selects the item (Check box) of the device name in the display for equipment feature as shown in FIG. 12, the control unit 490 provides the display picture (Not shown) for defining the equipment name which includes several input blanks for filling out equipment names, description on the equipment name, SECS equipment ID, SDR list and the like. When all of the data on the equipment names are inputted, the control unit 490 stores them into the database 340.

The operator defines the respective sequence name for the semiconductor fabrication after the definition for the equipment features (Step S506). The sequence name defines a message group unit corresponding to the respective sequence by which one SECS message corresponds to one process. Each sequence includes sub-component called a process. When the operator clicks the sequence definition menu button 730, the control unit 490 provides a display picture for defining the sequence name corresponding to the equipment group as shown in the FIG. 15. The operator clicks the right button of the mouse in the FIG. 15, and selects the "Create" menu from a plurality of the sub menus. Then, the control unit 490 provides a display picture for inputting the sequence name and the description on the sequence name. The operator inputs and defines the sequence name, and inputs the description on the sequence name. The control unit 490, then, stores the defined data for the sequence name into the database 340.

Subsequently, the operator combines the SECS messages required for the sequence name, and defines a trigger message of the combined SECS message (Step 508). When the operator clicks the sequence definition menu button 730 in the menu bar, the control unit 490 provides a display picture for combining the equipment group, sequence name and SECS message as shown in the FIG. 15. When the operator specifies the equipment group, the control unit 490 reads out a plurality of the sequence name involved in the corresponding equipment group from the database 340 and displays the list for the sequence names. The operator selects one sequence name among a plurality of the sequence names and combines the SECS messages by specifying and moving the SECS messages required for the selected sequence name to the right message window by means of the drag-and-drop manner. Then, the equipment type, the trigger message, the transfer direction of the selected SECS message and SECS message name are displayed in the right message window.

In FIG. 15, the symbol "D" means key information representing a list of keys being selected and set among the messages transmitted from the equipment. The symbol "X" means a comparison expression which is used for distinguishing the structure of the messages transmitted from the equipment from others. The symbol "K" implies a routine keeping data being used for transferring message from the equipment to the server while keeping a specific channel by using a common EQS routine. The symbol "R" represents s a connection routine being used for connecting the data maintained in the specific channel with the corresponding routine and transferring them to the EQS. The symbol "S" means indicates a "send data to device" that represents whether there is a data to be transferred to the e equipment, and the symbol "E" means an exception handling used when an error occurs. The symbol "P" means a "definition parameter and point" used for collecting the location information of the trigger messages transferred from the equipment. The operator can set the key information, comparison expression, routine keeping data, connection routine, sending data to the equipment etc. by selecting the combined SECS messages and then clicking the right button of the mouse. The control unit 490 stores the set data to the database 340.

After the combination of a sequence name and a SECE message, the operator defines the equipment server EQS by selecting the EQS definition menu button 740 from the menu bar shown in FIG. 7 (Step 510). When the operator clicks the EQS definition menu button 740, the control unit 490 displays the picture shown in FIG. 16 for allowing the operator to define the EQS.

Figure 16:
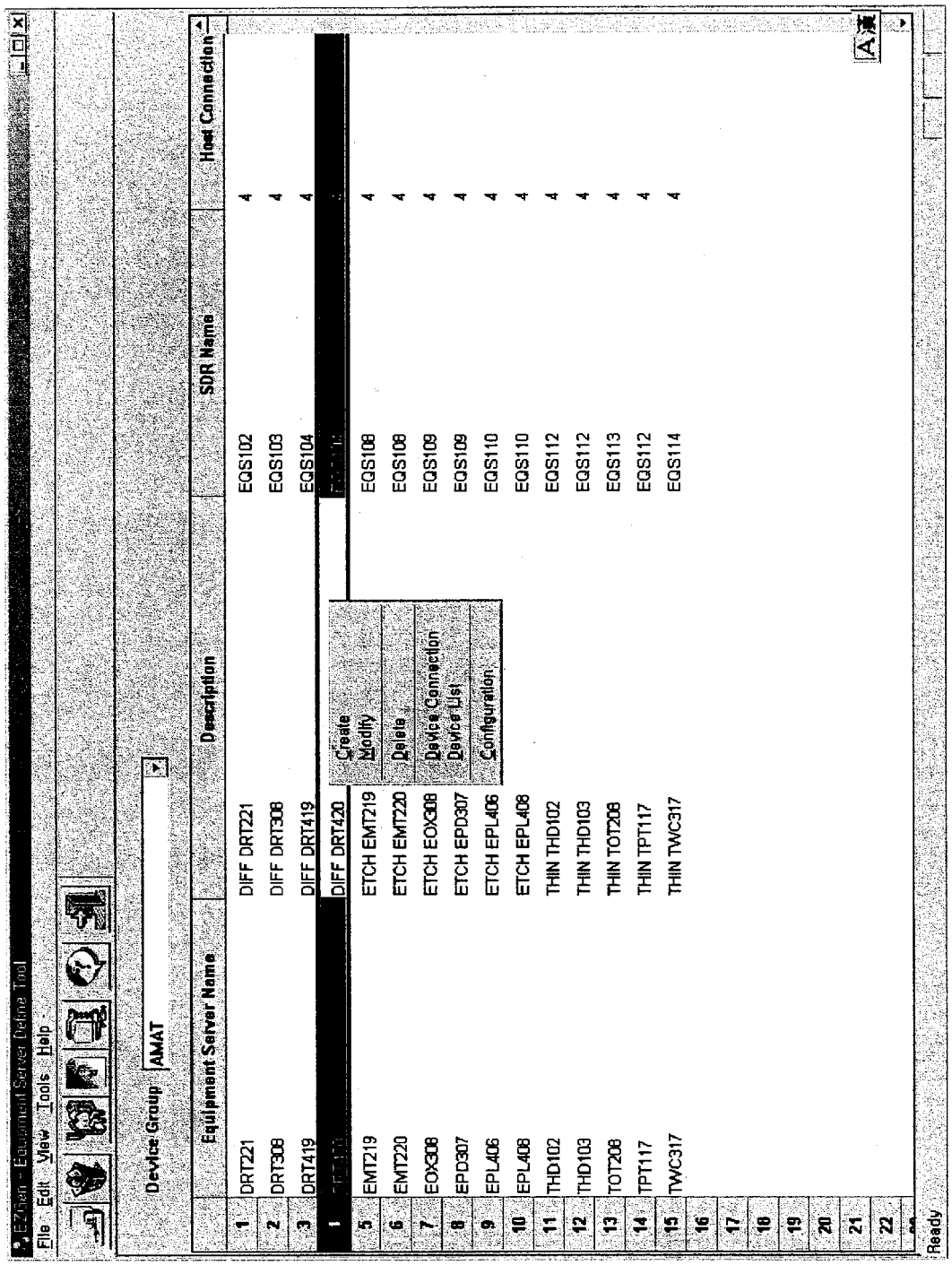
FIG. 16 shows an exemplary display for defining the equipment server.

The picture shown in the FIG. 16 provides tools for linking the defined equipment server name, the defined equipment name, and the defined server driver name (SDR name). That is, the control unit 490 provides the picture displaying the fields for the equipment group, the equipment server name, the description, the server driver name and the host connection. Subsequently, the operator sets the equipment server by clicking the right button of the mouse and selecting the "Create" menu in the picture shown as FIG. 16. The control unit 490 presents a picture in which the operator may inputs the equipment server name and the description therefor. When the operator inputs the equipment name and description, the control unit 490 displays a result picture. Subsequently, the operator locates the cursor of the mouse on the position of the inputted equipment server name, and selects the "device connection" menu among a plurality of the sub menus. Accordingly, all of the equipment names being linked with the equipment group are displayed in the form of a list. When the operator selects a specific equipment name, the selected equipment may be set be connected to the equipment server.

Figure 17:
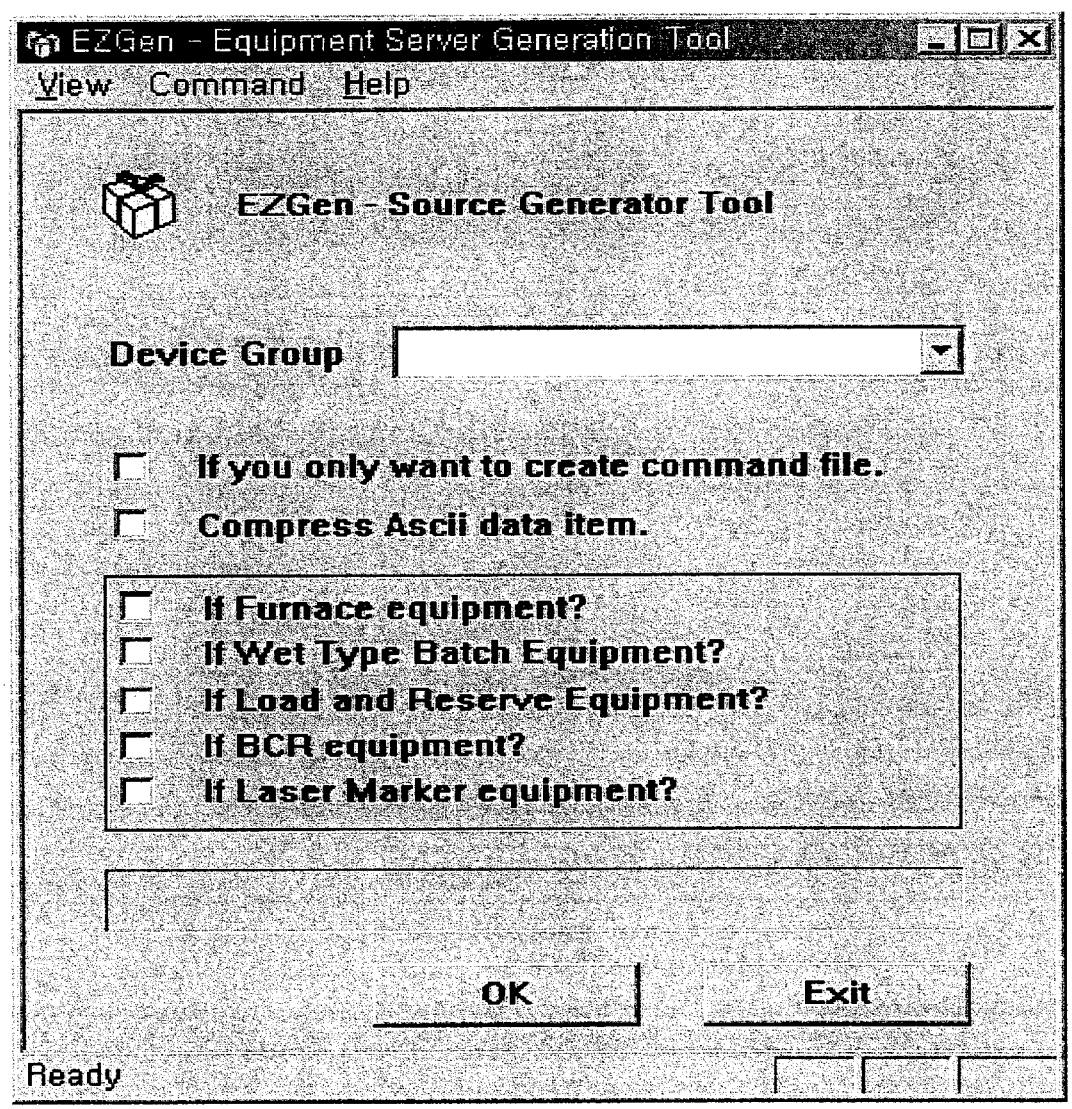
FIG. 17 shows an exemplary display relevant to execution of the automatic generation of SECS message source.

After defining the equipment server and the sequence names, the operator selects the source generation definition menu button 750 from the menu bar shown in FIG. 7 in order to have the final program source generated. The control unit 490 operates the SECS message source generating unit 440 and executes the "EzGen" (Step S512). Once the "EzGen" is executed, the program provides a picture shown as FIG. 17 by which the operator can set various options in automatic generating process of the SECS message source. The picture in FIG. 17 provides a field for selecting the equipment group; a check box for setting an option used for only compiling ("If you only want to create command file"); a check box for setting an option used for compressing data to ASCII format ("Compress ASCII Data Item"); a check box for setting an option used only for the equipment type of "Furnace" (If Furnace equipment); a check box for setting an option used for a wet type batch equipment (If wet type batch equipment); a check box for setting an option used for an equipment firstly loaded to the equipment port (If load and reserve equipment); a check box for setting an option used for only BCR equipment server (If BCR equipment); and a check box for setting an option used for a laser maker equipment (If laser maker equipment) ad so on. The operator may store all data in the equipment group in the format of electronic files. When the operator selects the equipment group and the required options, the control unit 490 generates communication program source for the SECS messages included in the equipment group by using the "EzGen" of the SECS message source generating unit 440. The program source regarding the SECS message is generated by the format of SML according to the driver type used, and is stored in the shared database 350 in the form of the electronic file. The SECS message source may be generated by using the program languages, for example, "C", "C++", "Visual Basic", etc. as well as in the SML format.

The control unit 490 checks the generated SECS messages, the defined equipment feature, the particulars about the equipment server and equipment group to see if these duly operate before applying them to the system. The control unit 490 simulates and tests each SECS message by operating the test simulation unit 450 and setting the equipment simulation and the equipment server simulation, etc. by using the simulation program. (Step S514) As a result of the simulation, if there is a SECS message presenting an error, a warning message display may be provided for re-defining and re-setting. The operator checks the warning message and re-defines the corresponding SECS message.

If the simulation test finds no error, the control unit 490 operates the communication interface defining unit 460. The communication interface defining unit 460 establishes a communication interface on the basis of the port setting data and the driver data inputted at the definition process for the equipment feature and the equipment server in order to communicate with the equipments 310~314 and other devices through the NIC 470 (Step S516).

Once the communication interface is set, the control unit 490 performs the SECS message communication with the equipments 310~314 (Step S518). For instance, after the control unit 490 receives a SECS message from the equipment 310, the control unit transmits a responding SECS message to the equipment 310.

In summary, the first preferred embodiment in accordance with the present invention provides a method for automatically generating SECS message program source according to the definition of the data required for the SECS message communication of the semiconductor fabricating system.

Meanwhile, a plurality of the computer programs or softwares are used and executed in the circumstance of the Internet. For example, special softwares such as Active Server Page (ASP) and Java Server Page (JSP) are used in order to generate web sites and embody various functions of the web site on the Internet. Moreover, the Internet may overcome limitations in time and space via which controlling a system and device at the remote place becomes possible.

Figure 18:
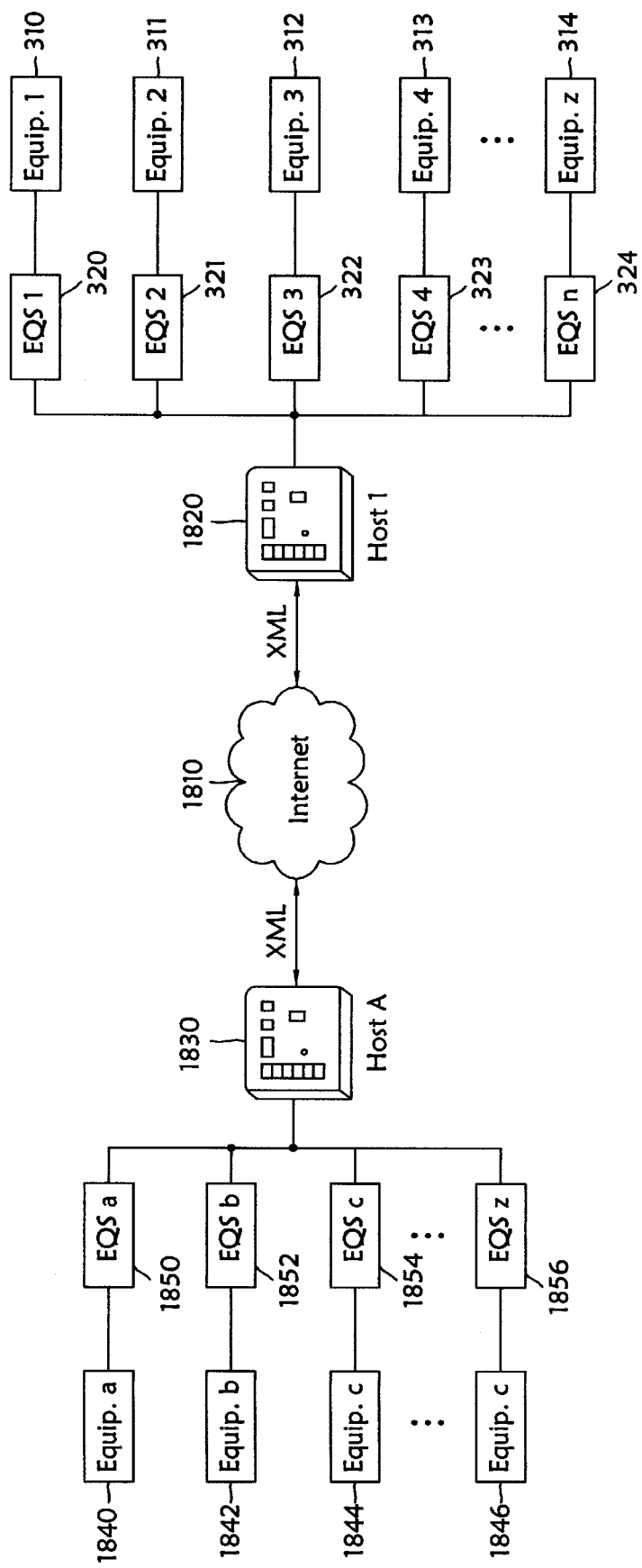
FIG. 18 shows constitution of the Internet system for fabricating semiconductor according to the second embodiment of the present invention.

FIG. 18 schematically shows a constitution of the Internet system for use in fabricating semiconductor, describing a method according to the second preferred embodiment of the present invention.

In FIG. 18, for the purpose of illustration, the same reference numbers will be used for the same elements shown in the FIG. 3.

The Internet system for semiconductor fabrication according to the second embodiment of the present invention comprises: the Internet 1810 as a communication channel for transmitting and receiving data between a plurality of remote computers; at least one host computer 1820, 1830 connected to the Internet for managing a plurality of equipment servers (EQSs); at least one equipments 1840~1846 for performing a semiconductor fabrication process; at least one equipment server (EQS) 1850~1856 for generating and transmitting a response SECS message for a query SECS message from the equipment 1840~1846 on the basis of the extensible Markup Language (XML).

For example, the Internet system in FIG. 18 may consist of the first host computer 1820 for managing a plurality of the EQSs 320~324 in the region of Busan, and the second host computer 1840 connected with the first host computer through the Internet for managing a plurality of the EQSs 1850~1856 in the region of Seoul which is more than 500 km away from Busan.

The extensible Markup Language (XML) is a descriptive language for a web page standardized by the World Wide Web consortium (WWW consortium) for the purpose of substituting the HyperText Markup Language (HTML). The XML extends the link function of the HTML and optimizes the Standard Generalized Markup Language (SGML) for use in the Internet, having the advantages of both the HTML and the SGML.

The XML has a hierarchy structure, and enables for the user to uniquely define Tags and describe a document such that it is suitable for expressing the SECS/GEM/HSMS protocol used for controlling semiconductor fabricating equipments. Moreover, the XML enables for a user to define and edit the SECS/GEM/HSMS protocol by using various parsers and the extensible Style-sheet Language (XSL) for expressing a style sheet. The XSL is a language used for making a style sheet illustrating how data communicated through the web is presented to user.

In the Internet system as above, for example, the host computer 1830 at Seoul may connect with the host computer 1820 via the Internet 1810, and may control a plurality of EQSs 320~340 managed by the host computer 1820. That is, when a system manager connects to a web site for controlling whole the system through the host computer 1830 at Seoul, the web site provides a web page displaying a menu for managing each of the remote semiconductor fabricating system, a menu for showing the present condition of the equipments, a menu for defining the EQS, a menu for defining the SECS message, and a menu for generating the SECS message source and so on.

And then, when the system manager selects the menu for showing the present condition of the EQSs 320~324 managed by the host computer 1820 at Busan, the web page displaying the SECS messages communicated between the EQSs 320~324 and the equipments 310~314 may be provided.

For example, if the query SECS message from the third equipment 312 is not settled, the web page presents a picture that the corresponding query SECS message have been transmitted to the EQS 322 but not settled yet. The system manager learns this status and subsequently recognizes the occurrence of error in the source of transmission of the SECS message.

Therefore, the system manager selects a menu for generating the SECS message on the web page, and then may re-define the SECS message following the steps of S502~S512 and re-establish the SECS message by combining the defined feature of the third equipment 312 and the EQS3 322. Subsequently, the system manager performs the function for transmitting the response SECS message to the third equipment 312. The re-defined SECS message may be generated by using the XML. These processes may be easily performed since the EQS has made a status history log file, a SECS communication log file and even the SECS message in the format of the XML.

Furthermore, the system manager may define and generate new SECS messages on the web site following the steps of S502~S518, and generate the corresponding SECS message source, and finally have the EQSs perform the SECS message communication with remote systems.

According to the second embodiment of the present invention, there is provided the Internet system for the semiconductor fabrication capable of automatically generating SECS message source and controlling the SECS message communication of the EQSs 320~324 at remote place through the Internet.

While the invention has been shown and described with respect to the preferred embodiments, it will be understood by the skilled in the art that various changes and modifications may be made without departing from the spirit and scope of the invention as defined in the following claims.

In addition, the inventive method and system may be applied to the GEM (Generic Equipment Model) or HSMC (High-speed SECS Message Services) system although the invention was described with respect to SECS system.

According to the present invention, a series of automation operations can be fast achieved, the maintenance thereof becomes easier since the program source for the SECS message may be automatically generated only by defining the semiconductor fabricating equipment and the equipment server (EQS), and then defining the SECS messages required for the SECS communication between the equipments and EQS.

Furthermore, it is possible to provide a more stable environment for fabricating the semiconductor by automating the equipment and constructing a database for the data required in the process of the semiconductor fabrication.

The present invention provides functions for controlling the SECS communication between remote equipments for fabricating semiconductor and the equipment servers (EQSs), and functions for defining the SECS and HSMS protocol in the form of the XML. In addition, since the automation, maintenance and repair of the equipments which are geographically dispersed done are done by using the Internet at a center site, the cost required for the automation and management of the semiconductor fabricating equipment can be enormously reduced.

What is claimed is:

1. A method for automatically generating program sources, each corresponding to a SECS (Semiconductor Equipment Communications Standard) messages for use in semiconductor manufacturing system including at least one fabricating equipments performing semiconductor fabricating processes, and at least one equipment servers for automatically performing coding the program sources, the SECS message being communicated between the fabricating equipments and the equipment servers, comprising the steps of:

(a) generating a defined SECS message by defining the SECS message for use in control of the semiconductor fabricating processes;

(b) defining data representing features of each of the fabricating equipment;

(c) generating a defined sequence name by defining a sequence name identifying each of the semiconductor fabricating processes;

(d) combining the SECS messages required for the defined sequence name;

(e) defining equipment groups according to the features of the fabricating equipments by combining SECS message with the defined sequence name; and (f) generating the SECS message by automatically performing coding of the program sources for the equipment groups.

2. The method for automatically generating program sources as claimed in claim 1, further comprising the steps of:

(g) testing the defined SECS message and the fabricating equipment by performing simulation after step (f);

(h) defining an interface required for a communication between the fabricating equipment and the equipment server; and (i) performing a SECS message communication between the fabricating equipment and the equipment server.

3. The method for automatically generating program sources as claimed in claim 1, wherein at step (a), a display is presented for inputting a SECS message definition, the display including input blanks for filling out a stream, a function and a variant of the SECS message, and input blanks for filling out a description on the SECS message, a transfer direction for the SECS message, a data indicating whether a reply is required, and a SECS message structure.

4. The method for automatically generating program sources as claimed in claim 1, wherein in the steps (a) to (e), the program sources are represented by the eXtensible Markup Language (XML).

5. The method for automatically generating program sources as claimed in claim 1, wherein the SECS message is coded by using a program language selected from the group of "C", "C++" and "Visual Basic."

6. A system for automatically generating program sources, each corresponding to a SECS (Semiconductor Equipment Communications Standard) message, the SECS message used in the SECS communications, comprising:

at least one fabricating equipments for performing semiconductor fabricating processes;

a manufacture execution system (MES) for supervising progresses and histories of lots, and resources on a semiconductor manufacturing site;

a database for storing the SECS message and data transferred from the fabricating equipments;

an equipment server including a SECS message defining unit for generating defined SECS messages by defining the SECS messages for use in control of semiconductor fabricating processes; an equipment feature defining unit for defining data on features of the fabricating equipments; an equipment group defining unit for generating defined sequence names by defining sequence names involved in the semiconductor fabricating processes and generating defined equipment groups by defining equipment groups by combining the SECS message required for the defined sequence names; a communication interface defining unit for defining an interface required for communicating with the fabricating equipments; a SECS message source generating unit for automatically performing coding of the SECS message source for the defined equipment groups; a test simulation unit for testing the defined SECS messages and the fabricating equipment by means of simulation; a network interface card for establishing a physical and logical connection for communications with the other systems; and a control unit for controlling overall operations of the system and automatic generation of the SECS message source.

7. A system for automatically generating program sources as claimed in claim 6, wherein the SECS message source generating unit includes a software program capable of automatically coding the defined SECS message in the format of Spacecraft Markup Language (SML) after defining the SECS message according to the features of the fabricating equipments and the defined sequence names, and a execution file for the software program is displayed on a window in the form of an icon.

8. A system for automatically generating program sources as claimed in claim 6, wherein the equipment feature defining unit provides an equipment feature input display which enables for an operator to select and define an equipment type (Type), an equipment group (Group), a server driver name (SDR Name) and an equipment name (Device Name), and is capable of displaying the result of the definition for equipment feature by means of items of the equipment type, a description, a SECS library, an equipment kind, and a protocol, respectively.

9. A system for automatically generating program sources as claimed in claim 6, wherein the program sources are coded in the format of the eXtensible Markup Language (XML).

10. A semiconductor fabrication system, sub-systems of which are geographically dispersed about and connected to each other by a communication network, comprising:

at least one fabricating equipments for performing semiconductor fabricating processes;

at least one equipment servers (EQS) for communicating SECS messages with the fabricating equipments connected thereto via the communication network; and a host computer connected to the communication network for automatically generating the SECS messages used for a SECS message communication between the fabricating equipments and the equipment servers (EQS) in the form of eXtensible Markup Language (XML), and for controlling the SECS message communication between the fabricating equipments and the equipment servers (EQS).

11. A semiconductor fabrication system as claimed in claim 10, wherein the host computer provides a web page including a menu for managing each of the sub-systems, a menu for showing a present condition of the fabricating equipments, a menu for defining the fabricating equipments, a menu for defining the equipment server (EQS), a menu for defining the SECS message, and a menu for generating the SECS message.

12. A semiconductor fabrication system as claimed in claim 11, wherein the menu for defining the fabricating equipment provides an equipment feature input display which enables for an operator to select and define an equipment type (Type), an equipment group (Group), a server driver name (SDR Name) and an equipment name (Device Name), and is capable of displaying the result of the definition for equipment features by means of the items of an equipment type, a description, a SECS library, an equipment kind, and a protocol.

13. A semiconductor fabrication system as claimed in claim 11, wherein the menu for generating the SECS message performs automatic coding for the SECS message to a document in the format of the eXtensible Markup Language (XML) according to features of the fabricating equipments and a sequence name.

14. A semiconductor fabrication system as claimed in claim 12, wherein in order to select and define an equipment group, there is provided a display comprising an upper frame including a means for selecting the equipment group, a part for displaying a sequence name, and a part for displaying the description, and a lower frame including a SECS message list, a transfer direction, a message and an equipment type, and then, when a menu for creating the equipment group is selected, there is provided a display picture including several input blanks for filling out a name of the equipment group, the description on the equipment group, a facility including the equipment group, a protocol, a library type and a list of the equipment group.

\* \* \* \* \*